Patented Mar. 22, 1938

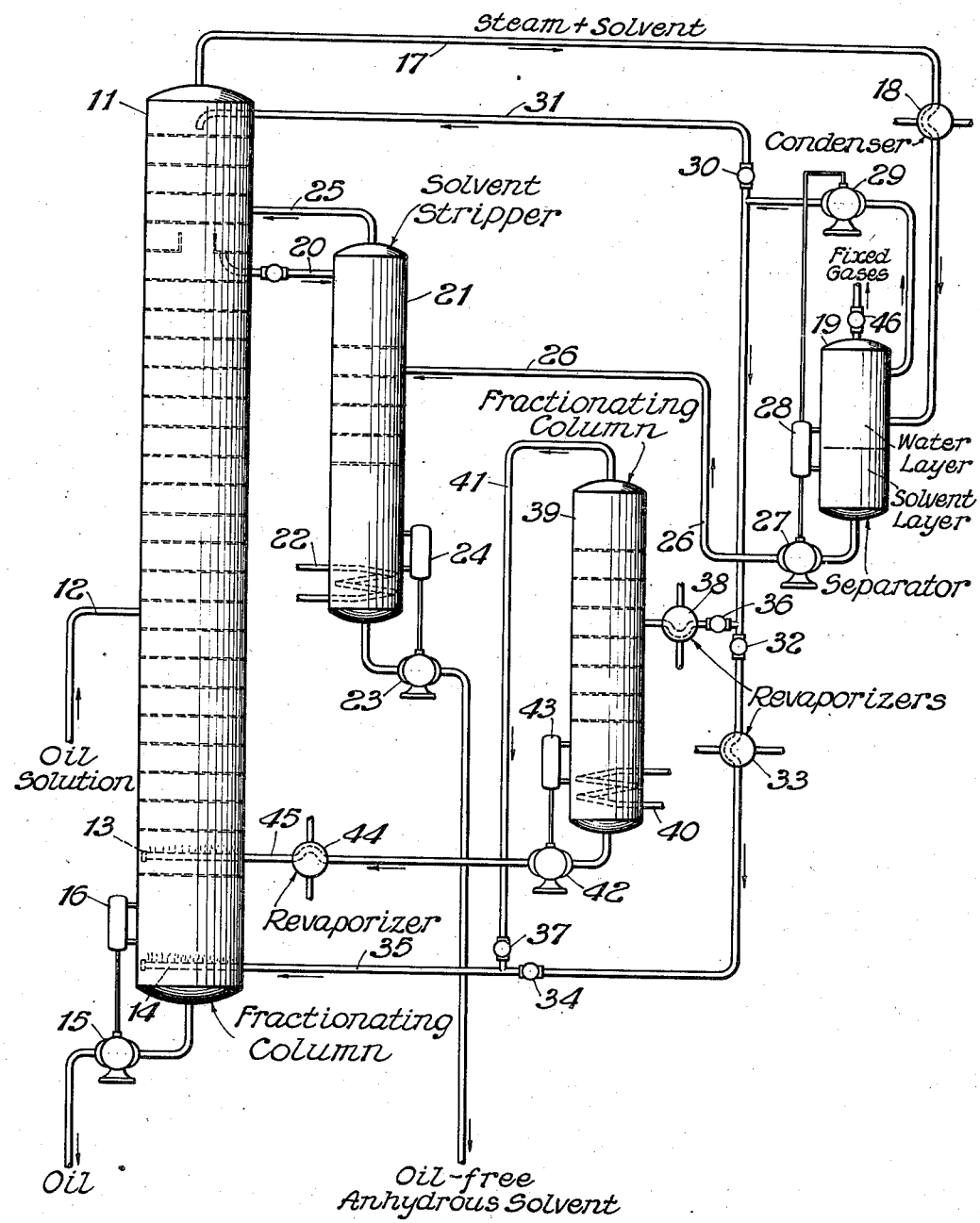

2,111,822

UNITED STATES PATENT OFFICE 2,111,822

RECOVERY OF SOLVENTS

Frederick W. Sullivan, Jr., Hammond, Ind., assignor to Standard Oil Company, Chicago, Ill., a corporation of Indiana Application October 1, 1934, Serial No. 746,329

10 Claims. (Cl. 202—39)

This invention relates to the recovery of solvents and more particularly to the recovery of solvents used in solvent extraction and solvent fractionation processes.

Processes for the solvent fractionation of petroleum oils and other materials by the use of selective solvents have recently attained commercial importance. Many of the solvents used have fairly high boiling points and they can best be recovered from the oil fractions by stripping with steam or other stripping medium. If, as is usually the case, the solvent is not completely soluble in the stripping medium the two will separate upon condensation and the bulk of the solvent can be removed from the bulk of the condensed stripping medium. The latter will, however, usually contain some solvent in solution and this must be recovered if solvent losses are to be avoided.

It is an object of my invention to provide a novel, economic and efficient means for recovering solvent dissolved in a stripping medium. Other and more detailed objects will become apparent as the description proceeds.

My invention can best be described by reference to the accompanying drawing which shows a diagrammatic flow diagram of one embodiment thereof.

Referring now more particularly to the drawing, an oil solution, for instance the raffinate or extract phase from a lubricating oil solvent fractionation process, enters fractionating tower 11 through line 12 and comes in contact with a rising stream of steam or other stripping medium from open coils 13 and/or 14. The oil introduced in solution through line 12 passes downward and ultimately out of tower 11 through pump 15 controlled by liquid level controller 16. The steam and solvent vapors pass out of tower 11 through line 17 and pass through condenser 18 to separator 19, where two liquid layers usually form.

In order to obtain solvent free from stripping medium a solvent stripper 21 can be used in conjunction with column 11. This side stripper takes its feed from a trap-out plate in tower 11 through valved line 20 and is heated at its base by a closed steam coil 22. Presuming that the solvent has a higher boiling point than the stripping medium used as is usually the case, the purified solvent is removed from the base of stripper 21 by means of pump 23 controlled by liquid level controller 24. The stripping medium vapors carrying some solvent vapors passes out of stripper 21 through line 25 and is returned to tower 11 preferably at a point above the point at which the feed for stripper 21 is withdrawn. It will be understood that in many cases stripper 21 can be dispensed with and all of the solvent recovered directly from separator 19.

Separator 19 is operated at a temperature depending on the solvent and stripping medium used. Usually a relatively low temperature is used in order to reduce the solubility of the solvent in the condensed stripping medium and the solubility of the stripping medium in the solvent. This temperature can be obtained by means of condenser 18 or otherwise. At the selected temperature the condensed vapors will usually separate into a solvent layer (usually containing more or less stripping medium in solution) and a condensed stripping medium layer (containing some solvent in solution). Depending on the relative specific gravities either of these layers may be the upper layer but usually this will be the stripping medium layer.

If the solvent layer does not contain a detrimental amount of stripping medium it can be returned directly to the solvent fractionation process but more usually it must be fractionated to remove condensed stripping medium. This can be done by recycling the solvent layer from separator 19 to solvent stripper 21 through line 26 by means of pump 27 controlled by liquid level controller 28. Alternatively the solvent layer can be recycled to fractionating column 11 at an intermediate level therein.

The condensed stripping medium layer is removed from separator 19 by means of pump 29 controlled by liquid level controller 28 and a portion of it is preferably returned to the top of column 11 as reflux through valve 30 and line 31. The remainder of the condensed stripping medium is revaporized and returned to the bottom of column 11 as stripping medium. Thus all of the solvent contained in the condensed stripping medium is returned to the system and none is lost.

It is, of course, apparent that the reflux in column 11 can be provided in other ways, for instance by means of a dephlegmator, and all of the condensed stripping medium layer can be revaporized and returned to column 11 as stripping medium. This, however, is usually less efficient than the scheme outlined in the last paragraph.

In the simplest form of my process that portion of the condensed stripping medium layer which is to be recycled as stripping medium passes through valve 32, revaporizer 33, valve 34 and line 35, and is returned to the bottom of column 11 through open coil 14. Since this stripping medium contains a certain amount of dissolved solvent, some solvent will be dissolved in the finished oil at the bottom of tower 11 which will pass out of the system, thus being lost. The amount of solvent thus lost will depend on the particular solvent used, the temperature at the base of column 11, and other factors. In some cases it is negligible but where it is desired to recover a maximum amount of solvent it is necessary to introduce the stripping medium carrying solvent vapors at a somewhat higher level in column 11 (for instance through coil 13) and to introduce a small amount of pure stripping medium at the bottom of the column (for instance through coil 14). At the same time, it is undesirable to use additional stripping medium since this would result in the stripping medium building up in the system and would require the discarding of stripping medium at some other point with consequent loss of dissolved solvent.

I have solved this problem in the following fashion: Valves 32 and 34 are closed and valves 36 and 37 are opened. The condensed stripping medium layer then passes through valve 36 and revaporizer 38 into column 39 (equipped with reboiling coil 40) wherein it is fractionally distilled to give a fraction relatively free from solvent and a fraction having an increased solvent content. The former will usually but not always be the low boiling fraction and, assuming this to be the case, will pass out of the top of column 39 and be returned to column 11 through line 41, valve 37, line 35 and open coil 14. The fraction having an increased solvent content passes out of column 39 at its base through pump 42, controlled by liquid level controller 43, is revaporized in revaporizer 44, and is returned to column 11 through line 45 and open coil 13, which is located at a higher level than that at which coil 14 is positioned. In the case of BB' dichlordiethyl ether and water, for example, the pure water will come off at the base of column 39 and the connections to coils 13 and 14 will be reversed.

Instead of fractionating all of the condensed stripping medium layer which is to be reused as stripping medium a portion of it can be passed directly from separator 19 to coil 13 and the rest can be passed through column 39, thereby effecting a considerable saving.

In some cases the solvent and stripping medium will form a constant boiling mixture and more elaborate fractionating systems must be used in place of the simple column 39. In other cases such difficulties can be obviated by controlling the temperature in separator 19 to give a solvent content in the condensed stripping medium layer which will permit of simple fractionation. Thus when steam is used as the stripping medium and phenol is used as the solvent, column 39 will operate satisfactorily if the phenol concentration in the water layer is less than about 8%. Thus separator 19 should be operated at a temperature at which the solubility of phenol in water is less than 8%. For instance separator 19 can be operated at 60° F. at which temperature water dissolves 6.7% phenol.

Returning to separator 19, it will be understood that the amount of solvent coming off through line 17 may be completely soluble in the condensed stripping medium and in this case separator 19 will be used only to remove fixed gases which can be accomplished by means of vent valve 46. These fixed gases can be further refrigerated or scrubbed to recover any solvent they contain. The total condensate in separator 19 will in this event be recycled either as stripping medium or as reflux.

In addition to the chemical compound phenol other phenols such as the ortho, meta and para cresols and the mixtures known as cresylic acids, wood tar acids, etc. can be used. Other selective solvents such as BB' dichlordiethyl ether, nitrobenzene, aniline, chloraniline, etc. can be used. Where steam is used as the stripping agent my invention is applicable to any solvent which has an appreciable water solubility and which is preferably not completely soluble in water under the desired operating conditions. Similar considerations apply where stripping media other than water are used, and if the desired solvent is completely soluble in water a stripping medium in which it is not completely soluble can be used. In other cases, as has been described, the bulk of the solvent can be removed from a side stripper or from an intermediate level in the main column and the total condensate from the top of the main column can be recycled in accordance with my invention even though the solvent is completely soluble in the condensed stripping medium under the prevailing conditions.

While I have described my invention in connection with certain preferred embodiments, it is to be understood that these are by way of illustration rather than by way of limitation and I do not mean to be bound thereby but only to the proper subject matter of the appended claims.

I claim:

1. In a process for the recovery of a solvent from an oil fraction dissolved in said solvent, wherein said solvent is distilled from said oil in a distilling zone in the presence of a stripping medium, said solvent and said stripping medium being largely immiscible with each other in the liquid state but said stripping medium having a small solvent power for said solvent; the improved method of conserving said solvent and controlling conditions in said distilling zone comprising condensing said stripping medium and said solvent from said distilling zone and effecting a separation in a settling zone into a first layer of solvent and a second layer of stripping medium, said second layer containing some solvent in solution, dividing said second layer into a first stream and a second stream, returning said first stream to said distilling zone as reflux for controlling the fractionation in said zone, and reintroducing said second stream into said distilling zone as recycled stripping medium.

2. A process for the recovery of a solvent from an oil fraction dissolved therein comprising fractionally distilling the solution in the presence of a stripping medium largely immiscible with said solvent in the liquid state, removing the solvent vapors and stripping medium vapors from said fractional distilling step to a condensing and settling zone to form a solvent layer and a stripping medium layer in said settling zone, the latter containing some solvent in solution, removing the solvent layer, dividing said stripping medium layer into a first stream and a second stream in predetermined proportions, returning said first steam to said fractional distillation step as reflux, and returning said second stream to said fractional distillation step as recycled stripping medium.

3. A process for the recovery of a solvent from a solution of solvent and oil comprising introducing said solution into a primary distillation zone at a first point therein, fractionally distilling said solution in the presence of stripping medium in said distillation zone, removing solvent and stripping medium from a second point in said distillation zone to an auxiliary distillation zone, separating solvent from stripping medium in said auxiliary distillation zone, removing said separated solvent therefrom and returning said stripping medium to said primary distillation zone at a third point therein, removing the overhead from said primary distillation zone from a fourth point therein to a condensing zone, allowing said stripping medium and solvent contained therein to form a first liquid phase consisting largely of solvent, and a second liquid phase consisting largely of condensed stripping medium containing some solvent in solution, dividing said second liquid phase into a first stream and a second stream, introducing said first stream into said primary distillation zone as reflux for controlling fractionation, and reintroducing said second stream into said distillation zone as a continuously recycled stripping medium.

4. A process for the recovery of a high boiling solvent from lubricating oil dissolved therein comprising introducing the solution of said material in said solvent into a continuous distillation system, fractionally distilling said solution in said continuous distillation system in the presence of a stripping medium largely immiscible with said solvent in the liquid state but having a small solvent power for said solvent, removing stripped oil from one end of said continuous distillation system, removing vapors of stripping medium and solvent from the other end of said continuous distillation system, condensing said vapors to form a liquid phase consisting largely of solvent and a liquid phase consisting largely of condensed stripping medium carrying some solvent in solution, fractionally distilling at least a portion of said last-mentioned liquid phase into a first fraction comprising stripping medium relatively uncontaminated with solvent and a second fraction comprising stripping medium having a relatively high solvent content, introducing said second fraction into said continuous distillation system at a first point near but not at the end at which said stripped oil is removed, and introducing said first fraction into said continuous distillation system at a second point nearer than said first point to the end at which said stripped oil is removed in order to remove more thoroughly residual solvent from the stripped oil removed from said continuous distillation system.

5. A process according to claim 4 in which said stripping medium comprises steam.

6. A process according to claim 4 in which said solvent comprises phenol and said stripping medium comprises steam.

7. A process for the recovery of a high boiling solvent from lubricating oil dissolved therein comprising introducing the solution of said material in said solvent into a continuous distillation system, fractionally distilling said solution in said continuous distillation system in the presence of a stripping medium largely immiscible with said solvent in the liquid state but having a small solvent power for said solvent, removing stripped oil from one end of said continuous distillation system, removing vapors of stripping medium and solvent from the other end of said continuous distillation system, condensing said vapors to form a liquid phase consisting largely of solvent and a liquid phase consisting largely of condensed stripping medium carrying some solvent in solution, fractionally distilling at least a portion of said last-mentioned liquid phase into a first fraction comprising stripping medium relatively uncontaminated with solvent and a second fraction comprising stripping medium having a relatively high solvent content, introducing said second fraction into said continuous distillation system in vapor form at a first point near but not at the end at which said stripped oil is removed, and introducing said first fraction into said continuous distillation system in vapor form at a second point nearer than said first point to the end at which said stripped oil is removed in order to remove more thoroughly residual solvent from the stripped oil removed from said continuous distillation system.

8. A process for the recovery of a high boiling solvent from lubricating oil dissolved therein comprising introducing the solution of said material in said solvent into a continuous distillation system, fractionally distilling said solution in said continuous distillation system in the presence of a stripping medium largely immiscible with said solvent in the liquid state but having a small solvent power for said solvent, removing stripped oil from one end of said continuous distillation system, removing vapors of stripping medium and solvent from the other end of said continuous distillation system, condensing said vapors to form a liquid phase consisting largely of solvent and a liquid phase consisting largely of condensed stripping medium carrying some solvent in solution, recycling at least a portion of said last-mentioned liquid phase to a point near said last-mentioned end of said continuous distillation system as reflux, fractionally distilling at least a portion of said last-mentioned liquid phase into a first fraction comprising stripping medium relatively uncontaminated with solvent and a second fraction comprising stripping medium having a relatively high solvent content, introducing said second fraction into said continuous distillation system at a first point near but not at the end at which said stripped oil is removed, and introducing said first fraction into said continuous distillation system at a second point nearer than said first point to the end at which said stripped oil is removed in order to remove more thoroughly residual solvent from the stripped oil removed from said continuous distillation system.

9. A process for the recovery of a high boiling solvent from lubricating oil dissolved therein comprising introducing the solution of said material in said solvent into a continuous distillation system, fractionally distilling said solution in said continuous distillation system in the presence of a stripping medium largely immiscible with said solvent in the liquid state but having a small solvent power for said solvent, removing stripped oil from one end of said continuous distillation system, removing vapors of stripping medium and solvent from the other end of said continuous distillation system, condensing said vapors to form a liquid phase consisting largely of solvent and a liquid phase consisting largely of condensed stripping medium carrying some solvent in solution, recycling at least a portion of said last-mentioned liquid phase to a point near said last-mentioned end of said continuous distillation system as reflux, fractionally distilling at least a portion of said last-mentioned liquid phase into a first fraction comprising stripping medium relatively uncontaminated with solvent and a second fraction comprising stripping medium having a relatively high solvent content, introducing said second fraction into said continuous distillation system in vapor form at a first point near but not at the end at which said stripped oil is removed, and introducing said first fraction into said continuous distillation system in vapor form at a second point nearer than said first point to the end at which said stripped oil is removed in order to remove more thoroughly residual solvent from the stripped oil removed from said continuous distillation system.

10. A process for the recovery of a high boiling solvent from lubricating oil dissolved therein comprising introducing the solution of said lubricating oil in said solvent into a continuous distillation system at a first point, fractionally distilling said solution in said continuous distillation system in the presence of a stripping medium, removing vapors of solvent and stripping medium from a second point in said continuous distillation system to an auxiliary continuous distillation system, separating solvent from stripping medium in said auxiliary continuous distillation system, removing solvent from said auxiliary continuous distillation system, returning stripping medium from said auxiliary continuous distillation system to said continuous distillation system, removing stripping medium and solvent vapors from said continuous distillation system at a third point, fractionating at least a portion of the stripping medium and solvent removed at said third point into a first fraction comprising stripping medium relatively uncontaminated with solvent and a second fraction comprising stripping medium having a relatively high solvent content, introducing said second fraction into said continuous distillation system for stripping purposes at a fourth point, and introducing said first fraction into said continuous distillation system for stripping purposes at a fifth point; said points being disposed in the following sequence along the path of the stripping medium in said continuous distillation system: said fifth point, then said fourth point, then said first point, then said second point, then said third point.

FREDERICK W. SULLIVAN, Jr.